(12) United States Patent (10) Patent No.: US 8,356,258 B2
Matthews et al. (45) Date of Patent: Jan. 15, 2013

(54) ARRANGING DISPLAY AREAS UTILIZING ENHANCED WINDOW STATES

(75) Inventors: David A. Matthews, Seattle, WA (US); Mohamed A. M. Sadek, Redmond, WA (US); Stephan Hoefnagels, Seattle, WA (US); Ivan Brugiolo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 12/024,706

(22) Filed: Feb. 1, 2008

(65) Prior Publication Data

US 2009/0199128 A1 Aug. 6, 2009

(51) Int. Cl.
*G06F 3/048* (2006.01)
(52) U.S. Cl. ........ 715/788; 715/798; 715/799; 715/800; 715/830; 345/684
(58) Field of Classification Search .................. 715/799, 715/798, 800, 788, 830, 847, 784, 781; 345/684
See application file for complete search history.

(56) References Cited

U.S. PATENT DOCUMENTS

| 5,227,771 | A | | 7/1993 | Kerr | |
|---|---|---|---|---|---|
| 5,485,174 | A | * | 1/1996 | Henshaw et al. | 345/684 |
| 5,699,535 | A | | 12/1997 | Amro | |
| 5,704,050 | A | * | 12/1997 | Redpath | 715/764 |
| 6,008,809 | A | | 12/1999 | Brooks | |
| 6,016,145 | A | | 1/2000 | Horvitz | |
| 6,204,845 | B1 | | 3/2001 | Bates | |
| 6,396,520 | B1 | | 5/2002 | Ording | |
| 6,480,207 | B1 | | 11/2002 | Bates | |
| 6,636,244 | B1 | * | 10/2003 | Kelley et al. | 715/781 |
| 6,654,035 | B1 | * | 11/2003 | DeStefano | 715/798 |
| 6,825,860 | B1 | | 11/2004 | Hu | |
| 7,370,284 | B2 | * | 5/2008 | Andrea et al. | 715/788 |
| 7,444,599 | B1 | * | 10/2008 | Chaudhri et al. | 715/830 |
| 7,552,397 | B2 | * | 6/2009 | Holecek et al. | 715/788 |
| 7,665,038 | B1 | * | 2/2010 | Chaudhri et al. | 715/830 |
| 7,665,039 | B2 | * | 2/2010 | Chaudhri et al. | 715/830 |
| 7,886,233 | B2 | * | 2/2011 | Rainisto et al. | 715/773 |
| 7,917,864 | B2 | * | 3/2011 | Bertram et al. | 715/777 |
| 7,949,954 | B1 | * | 5/2011 | Jezek, Jr. | 715/800 |
| 7,961,202 | B2 | * | 6/2011 | Conner et al. | 345/660 |

(Continued)

OTHER PUBLICATIONS (No Author), "WinArranger Free," http://arrange.qarchive.org/.

(Continued)

*Primary Examiner* — Doon Chow
*Assistant Examiner* — David Choi
(74) *Attorney, Agent, or Firm* — Shook Hardy & Bacon, LLP

(57) ABSTRACT

Computer-readable media, computerized methods, and user interfaces (UIs) for manipulating display areas on a GUI workspace by transitioning the display areas from an original state to one of a set of enhanced window states are provided. Initially, an indication to resize a display area is received at an operating system, which consequently invokes an appropriate window state. The indication may include capturing an edge of the display area and vertically dragging the edge to a dock-target region, thereby invoking a vertically-maximized state. Accordingly, configuration settings of the vertically-maximized state are applied such that the display area is stretched to approximately the screen height. In another instance, the indication may include capturing the display area and dragging a display area into a dock-target region, thereby invoking a semi-maximized state. Configuration settings of the semi-maximized state are applied, thus, extending the display area to approximately cover a predefined GUI workspace region.

18 Claims, 9 Drawing Sheets

U.S. PATENT DOCUMENTS

| | | | |
|---|---|---|---|
| 2002/0191027 A1 | 12/2002 | Morrow | |
| 2003/0107604 A1 | 6/2003 | Ording | |
| 2007/0192726 A1 | 8/2007 | Kim | |
| 2007/0250788 A1 | 10/2007 | Rigolet | |
| 2008/0016461 A1* | 1/2008 | Hoblit | 715/788 |
| 2008/0034317 A1* | 2/2008 | Fard et al. | 715/781 |
| 2009/0013282 A1* | 1/2009 | Mercer | 715/788 |
| 2009/0055768 A1* | 2/2009 | Chaudhri et al. | 715/784 |
| 2009/0106704 A1* | 4/2009 | De Leon | 715/847 |
| 2009/0122018 A1* | 5/2009 | Vymenets et al. | 345/173 |
| 2009/0199128 A1* | 8/2009 | Matthews et al. | 715/799 |
| 2010/0146378 A1* | 6/2010 | Bank et al. | 715/234 |

OTHER PUBLICATIONS

Matthias Muller-Proove, "Resizing Windows," http://www.mprove.de/script/05/uxf/newsletter10.html.

"Expert productivity," http://global.acer.com/products/notebook/tm8100.htm.

\* cited by examiner

ARRANGING DISPLAY AREAS UTILIZING ENHANCED WINDOW STATES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Presently, operating systems provide a variety of utilities that assist in opening display areas (e.g., windows) within a GUI workspace being presented at a display device (e.g., computer monitor, screen on a mobile device, and the like). Often, the GUI workspace becomes cluttered leaving insufficient space to show each window in its entirety. This clutter may be reduced by arranging the windows utilizing an input device (e.g., mouse or keyboard). Typically, arranging includes adjusting the attributes of a window with respect to the GUI workspace, such as resizing and repositioning a window, thereby allowing users to efficiently perceive content, or other information, within each window while working on a particular task. However, multiple clicks and precise movements of the input device are required to achieve rearrangement of the windows. Accordingly, arranging windows is not fluid or flexible, and the amount of input-device actions reduce computing efficiency. Further, a typical user will rearrange display areas within the GUI workspace frequently, thus, exaggerating the encumbrance of arranging display areas according to present techniques.

Occasionally, actuation devices are provided to assist in circumventing the present techniques for arranging display areas. The actuation devices are typically visible on the GUI workspace and trigger window states upon activation. Window states are limited to a select group of common display area sizes (e.g., minimized, maximized, and restored). Transitioning a display area to another size requires utilizing the present burdensome techniques for arranging display areas. As such, the occasion for accessing the common display area sizes is reserved for only a handful of instances. Also, the visible actuation devices add clutter to a GUI display, thereby distracting a user from the content within the display areas.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide computerized methods, user interfaces (UIs), and computer-readable media having computer-executable instructions embodied thereon, residing in an operating system, for managing and manipulating display areas on a GUI workspace presented on one or more display devices. In particular, intuitive techniques for arranging display areas, by transitioning an original state of the display area to one of a set of enhanced window states, are provided.

Initially, an indication to resize a display area is received at an operating system. Typically, the display area is present at a graphical user interface (GUI) workspace that is rendered on a display device, which is operably coupled to the operating system. The indication to resize may involve various user-initiated actions. Each of these actions invokes a triggered state of a set of window states, where the triggered state is associated with particular configuration settings. The set of window states are adapted to the resize of the display area with limited user-initiated actions, and thus, the display area is arranged resourcefully within the available space.

In addition, the appropriate configuration settings are applied to the display area, accordingly, the display is transitioned from an original state to the triggered state. In one instance, the indication to resize includes capturing an edge of the display area and vertically dragging the edge to a dock-target region located at an edge of the GUI workspace. In this instance, a vertically-maximized state is the triggered state selected from the set of window states. As such, configuration settings of the vertically-maximized state are applied to the display area, thereby stretching the display area to approximately the screen height. In another instance, the indication to resize includes capturing the display area and dragging a cursor tool into a dock-target region located at a right or left edge of the GUI workspace. In this instance, a semi-maximized state is the triggered state selected from the set of window states. As such, configuration settings of the semi-maximized state are applied to the display area, thereby rendering the display area on approximately half the GUI workspace. Accordingly, the embodiments of the present invention relate to, in part, an approach for adding behaviors to a GUI workspace such that navigation between window states is fast (e.g., less distance for a mouse to move, fewer clicks) and intuitive. In addition, a feature of the present invention is to increase the types of display areas providing increased opportunities to access predefined window states.

BRIEF DESCRIPTION OF THE DRAWINGS

The present invention is described in detail below with reference to the attached drawing figures, wherein.

DETAILED DESCRIPTION

Figure 1:
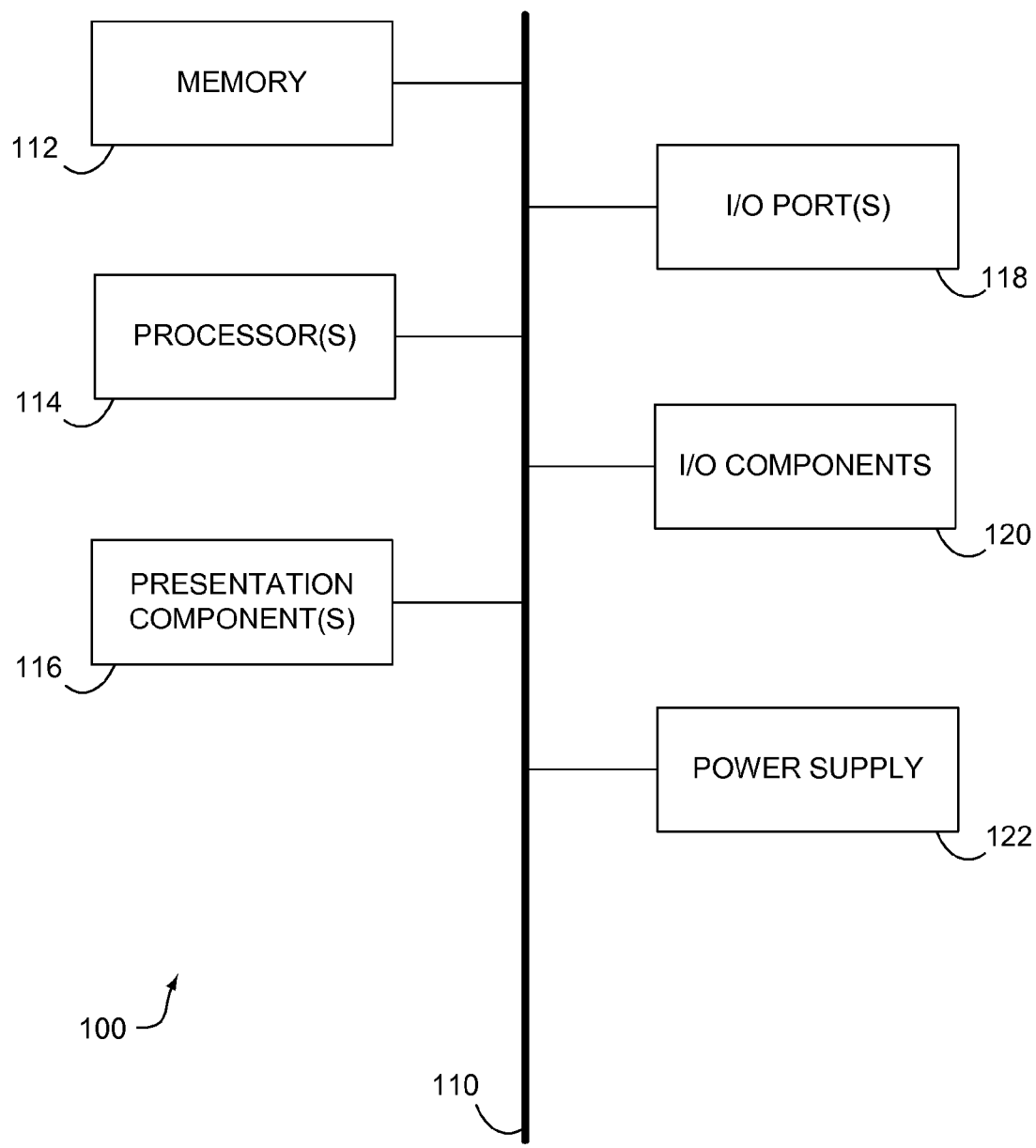
FIG. 1 is a block diagram of an exemplary computing environment suitable for use in implementing embodiments of the present invention.

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computerized methods, UIs, and computer-readable media having computer-executable instructions embodied thereon, residing in an operating system, for managing and manipulating display areas on a GUI workspace presented on one or more display devices.

Accordingly, in one aspect, the embodiments of the present invention provide one or more computer-readable media having computer-executable instructions embodied thereon that, when executed, perform a method for arranging a display area on a GUI workspace characterized by a screen height and a screen width. Initially, the method includes receiving one or more indications to resize the display area being presented on the GUI workspace. In one instance, the indications may select a vertically-maximized state for resizing the display area. If the indications select a vertically-maximized state, configuration settings related thereto are applied to the display area. Generally, the configuration settings of the vertically-maximized state include a vertical dimension and a horizontal dimension. In embodiments, the vertical dimension corresponds to approximately the screen height and the horizontal dimension is less than the screen width. Accordingly, the display area is automatically transitioned to the vertically-maximized state such that a window height of the display area is rendered on the GUI workspace according to the vertical dimension of the vertically-maximized state.

In another aspect, a computerized method for transitioning a display area between a semi-maximized state and a restored state is provided. In embodiments, one or more dock-target regions on a GUI workspace are utilized. The GUI workspace includes a screen height, measured between horizontal edges of the GUI workspace, and a screen width measured between vertical edges of the GUI workspace. Initially, the method includes tracking movements of a cursor tool within the GUI workspace, where the GUI workspace is configured to present a display area in an original state. An indication of capturing the display area with the cursor tool is received. Incident to receiving the indication of capturing, dock-target regions are constructed adjacent to, at least, one of the horizontal edges or the vertical edges of the GUI workspace. In an exemplary embodiment, a type of input device providing the indication of capturing is identified such that a screen area within each of the dock-target regions is established according to the identified type of input device. In addition, each of the dock-target regions are associated with one of a set of window states. A determination of whether the cursor tool entered within the dock-target regions is made utilizing the tracked movements of the cursor tool while the display area is captured. Incident to determining that the cursor tool entered within the dock-target regions, the display area is automatically transitioned from the original state to a triggered state. Generally, the triggered state corresponds to one of the set of window states that is associated with the entered dock-target regions.

In yet another aspect, embodiments of the present invention relate to computer-readable media that has computer-executable instructions embodied thereon for presenting, on a display device, a user interface configured to produce features for arranging a display area on a GUI workspace. Typically, these features are actuated by dragging the display area utilizing a cursor tool. Generally, the user interface includes the GUI workspace, an upper dock-target region, a lower dock-target region, a right dock-target region, and a left dock-target region. The GUI workspace includes horizontal edges and vertical edges, where screen parameters are derived from the GUI workspace. In one instance, screen parameters include a screen height, measured between the horizontal edges, and a screen width measured between the vertical edges. The vertical edges may include a left edge and a right edge, and the horizontal edges may include a top edge and a bottom edge. The upper dock-target region is defined by the top edge and a first trigger line in substantial parallel-spaced relation to the top edge. The lower dock-target region is defined by the bottom edge and a second trigger line in substantial parallel-spaced relation to the bottom edge. The right dock-target region is defined by the right edge and third trigger line in substantial parallel-spaced relation to the right edge. And, the left dock-target region is defined by the left edge and fourth trigger line in substantial parallel-spaced relation to the left edge. In an exemplary embodiment, screen areas within the upper dock-target region and the lower dock-target region are mapped to configuration settings of a maximized state, and screen areas within the right dock-target region and the left dock-target region are mapped to configuration settings of a semi-maximized state.

Generally, embodiments of the present invention relate to transitioning a display area between an original state and a triggered state. As discussed above, the triggered state corresponds to one of the set of window states that is associated with the entered dock-target regions. In one embodiment, the indication to resize invokes a triggered state that is a vertically-maximized state selected from the set of window states. As used herein, the phrase "vertically-maximized state" is not meant to be limiting and may encompass any state that stretches the display area to approximately the screen height. In one instance, the vertically-maximized state is invoked upon detecting a user-initiated selection of a top or bottom edge of the display area with a cursor tool (e.g., capturing an edge of the display area), and a movement of the cursor tool into an upper or lower dock-target region, while the edge remains captured. Upon recognizing the vertically-maximized state is invoked, configuration settings defining the vertically-maximized state are applied to the display area. In embodiments application of the configuration settings direct an edge opposed to the selected edge to be extended in a snap-style adjustment to a dock-target region orthogonally opposed to the dock-target region that was entered by the cursor tool. Accordingly, in the vertically-maximized state, the display area assumes a window height of substantially a screen height, while the window width remains constant.

In another instance, the indication to invoke the vertically-maximized state is a selection at an actuation device (e.g., top and bottom resize bars proximate to the edges of the display area) with the cursor tool. In an exemplary embodiment, the actuation device is hidden (e.g., insignificant on the GUI workspace). Accordingly, this approach avoids adding new buttons or icons to the display area that cause clutter and complexity on the GUI workspace. In yet another instance, the indication invoking the vertically-maximized state is a keystroke sequence, or shortcut key(s), actuated at a key pad. Although three different configurations of an indication to resize the display area to a vertically-maximized state have been described, it should be understood and appreciated that other indications to resize could be used, and that the invention is not limited to those indications shown and described.

In another embodiment, the indication to resize invokes a triggered state that is a semi-maximized state selected from the set of window states. As used herein, the phrase "semi-maximized state" is not meant to be limiting and may encompass any state that resizes and positions the display area to extend across a predetermined portion of the GUI workspace. In an exemplary embodiment, configuration settings that define the semi-maximized state include a vertical dimension that corresponds to the screen height, of the GUI workspace, and a horizontal dimension that corresponds to a ratio of the screen width. Typically, the ratio is ½ the screen width, thereby presenting the display area in the semi-maximized state on either the right or left half of the screen. However, other ratios may be used, which may be dependent on the size of the GUI workspace, the number of display devices acting in cooperation to present the GUI interface, user preferences, and any other criteria that would impact the configuration of the GUI workspace.

In one instance, the vertically-maximized state is invoked upon detecting a user-initiated selecting the display area with a cursor tool (e.g., capturing a header bar of the display area), and a movement of the cursor tool into a right or left dock-target region, while the edge remains captured. Upon recognizing the semi-maximized state is invoked, configuration settings defining the semi-maximized state are applied to the display area, as discussed above. Accordingly, in the semi-maximized state, the display area fills a predetermined portion of the GUI workspace, thereby facilitating rapidly arranging windows to a convenient orientation on the GUI workspace (e.g., viewing two documents displayed in individual display areas side by side).

In another instance, the indication to invoke the vertically-maximized state is a selection at an actuation device (e.g., right or left resize bars proximate to the edges of the display area) with the cursor tool. As discussed above, the actuation device may be displayed such that it is unnoticeable to a user. In yet another instance, the indication invoking the semi-maximized state is a keystroke sequence. Although three different configurations of an indication to resize the display area to a semi-maximized state have been described, it should be understood and appreciated that other indications to resize could be used, and that the invention is not limited to those indications shown and described.

Although two different optimal window states have been described above, it should be understood and appreciated by those of ordinary skill in the art that window states that enhance user efficiency could be invoked upon triggering a dock-target region (e.g., a maximized state), and that embodiments of the present invention are not limited to those window states shown and described.

In exemplary embodiments, dock-target regions are made available to invoke a triggered state of the display area upon a cursor tool, or tip of the cursor tool, entering therein. Alternatively, upon a cursor tool exiting a dock-target region, a restored state of the display area may be invoked, where the restored state corresponds to the original state of the display area prior to transitioning to the triggered state. As used herein, "dock-target regions" are not meant to be limiting and may encompass any area on the GUI workspace established to effect a transition between window states. In an exemplary embodiment, as discussed above, each dock-target region is associated with a particular window state that is triggered upon a cursor entering therein. Structurally, dock-target regions may enclose any screen area (e.g., geometrically shaped section) within the GUI workspace. In addition, the enclosed screen area may be pinned to an edge of the GUI workspace, centrally located, or established in any other location.

Generally, the enclosed screen area of a dock-target region is defined by an edge of the GUI workspace and a trigger line. Typically, the trigger line is an invisible user-interface feature that functions as a threshold which detects whether a cursor tool has passed thereover. The trigger line may be a straight line (e.g., in substantially parallel-spaced relation to the edge) or follow any other path as configured by the operating system. In an exemplary embodiment, the orientation of the trigger line is affected by a type of input device that provides an indication to resize the display area. For instance, a depth of the enclosed screen area between an edge and a trigger line (e.g., measured in pixels) is adjusted according to a type of input device. By way of example only, if the input device is a mouse, the depth of the enclosed screen area would decrease, as the mouse exerts precise location control over the cursor tool. That is, the tip of the cursor tool can be positioned within a thin dock-target region along an edge of the GUI workspace, thus, affording the user a larger central work area. However, if the input device is a touch-screen panel, the location of the trigger line is placed outward from the edge (e.g., increasing the depth of the enclosed area), as the methods for providing an input to a touchscreen are imprecise, especially at an edge of the GUI workspace. Accordingly, the technique of adjusting of the trigger line promotes a robust window-state manipulation tool that can adapt to various identified types of input devices.

Having briefly described an overview of embodiments of the present invention and some of the window states featured therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
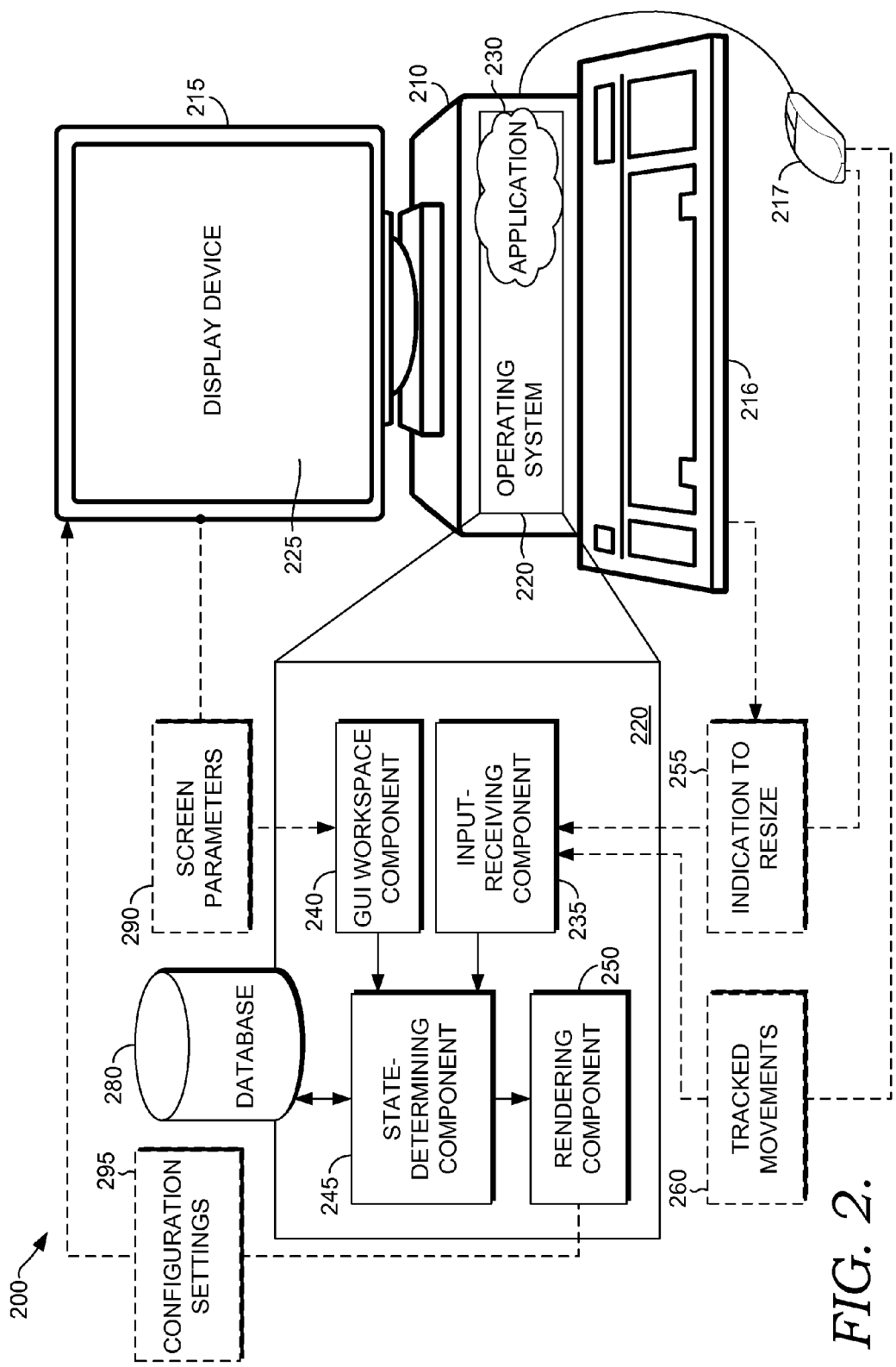
FIG. 2 is a schematic diagram of an exemplary system architecture suitable for use in implementing embodiments of the present invention, in accordance with an embodiment of the present invention.

Turning now to FIG. 2, a schematic diagram of an exemplary system architecture 200 suitable for use in implementing embodiments of the present invention is shown, in accordance with an embodiment of the present invention It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein. Further, logic within the operating system 220 supporting the exemplary system architecture 200 may be provided as a stand-alone product, as part of a software package, or any combination thereof.

Exemplary system architecture 200 includes a computing device 210 for generating a destination list from usage data captured at a registry, and for rending destinations within a sub-menu area upon detecting a request from a user. The computing device 210 may take the form of various types of computing devices. By way of example only, the computing device 210 may be a personal computing device (e.g., computing device 100 of FIG. 1), handheld device (e.g., personal digital assistant), consumer electronic device, various servers, and the like. Additionally, the computing device may comprise two or more electronic devices configured to share information therebetween.

In embodiments, the computing device 210 includes a display device 215, input devices 216 and 217, and hardware with an operating system 220 installed thereon. The computing device 210 is configured to present a UI display 225 on the display device 215. The display device 215, which is operably coupled to the computing device 210, may be configured as any presentation component that is be capable of presenting information to a user, such as a monitor, electronic display panel, touch-screen, and the like. In one exemplary embodiment, the UI display 225 is configured to present a display area in various window states (not shown), and/or to produce one or more dock-target regions initiated by the operating system 220, where the display area publishes content generated by application 230. In another exemplary embodiment, the UI display 225 is capable of producing a variety of configurations of dock-target regions based, in part, on the type of input device (e.g., the input devices 216 and 217) that is communicating with the operating system 220.

The input devices 216 and 217 are provided to provide input(s) affecting, among other things, manipulation of the display area between predefined window states. Illustrative devices include a key pad (as indicated by reference numeral 216), a mouse (as indicated by reference number 217), a joystick, a microphone, the I/O components 120 of FIG. 1, or any other component capable of receiving a user input and communicating an indication of that input to the computing device 210. By way of example only, the input devices 216 and 217 control the location of where a cursor tool is positioned (i.e., hovers) on the UI display 225 and/or the selection of buttons appearing on the UI display 225.

The operating system (OS) 220 refers generally to the software that manages the sharing of the resources of the computing device 210 and provides programmers with an interface used to access those resources. In operation, the operating system 220 interprets system data and detects user inputs (e.g., via the input devices 216 and 217), and responds by executing such processes as the following: prioritizing system requests (e.g., user-initiated request to view the destination list); allocating internal system resources; facilitating networking between the resources and/or devices, managing tasks (e.g., selecting an appropriate window state associated with a triggered dock-target area) and file systems; controlling output devices (e.g., rendering the display area in the appropriate state at the display device 215); and operating as a platform for programs residing thereon, such as target application 230.

In an exemplary embodiment, the operating system 220 includes an input-receiving component 235, a GUI workspace component 240, a state-determining component 245, and a rendering component 250. In addition, the operating system 220 may include a database 280. In another embodiment, the database 280 may reside on a remotely-located computing device (e.g., on another operating system, on a server located via a web address, etc.). The database 280 may be configured to store information that stores a set of window states. In various embodiments, such information may include, without limitation, an original state, a vertically-maximized state, a semi-maximized state, a restored state, a maximized state (discussed below), a minimized state, and any other window states that known in the relevant field. Further, though illustrated as a single, independent component, the database 280 may, in fact, be a plurality of databases, for instance, a server cluster.

This operating-system structure of the operating-system component 220 is but one example of a suitable structure that may be run on the computing device 210, and is not intended to suggest any limitation as to the scope of use or functionality of the invention. Neither should the illustrated operating system 220 be interpreted as having any dependency or requirement relating to any one or combination of the components 235, 240, 245, and 250 as illustrated. In some embodiments, one or more of the components 235, 240, 245, and 250 may be implemented as stand-alone applications. In other embodiments, one or more of the components 235, 240, 245, and 250 may be integrated directly into the display device 215 of the computing device 210, the application 230, or a combination thereof. By way of example only, the rendering component 250 may be housed in association with the display device 215. It will be understood by those of ordinary skill in the art that the components 235, 240, 245, and 250 illustrated in FIG. 2 are exemplary in nature and in number and should not be construed as limiting.

Any number of components may be employed to achieve the desired functionality within the scope of embodiments of the present invention. Although the various components of FIG. 2 are shown with lines for the sake of clarity, in reality, delineating various components/elements is not so clear, and metaphorically, the lines would more accurately be grey or fuzzy. Further, although some components and devices of FIG. 2 are depicted as single blocks, the depictions are exemplary in nature and in number and are not to be construed as limiting (e.g., although only one display device 215 is shown, many more may be operably coupled to the computing device 210, thereby functioning in conjunction to present the UI display 225).

In embodiments, the input-receiving component 235 is configured to receive and process indications to resize 225 from the input devices 216 and 217 and/or tracked movements from the input device 217. It should be understood and appreciated that other inputs from various other input devices (e.g., touch-screen panel) may be received and interpreted by the input-receiving device; accordingly, the scope of the present invention is limited to the inputs and input devices described herein. The indication to resize 255 includes any outputs within a scope of outputs produced by the input devices 216 and 217. In one embodiment, the outputs include indications of user-initiated actuation events associated with manipulating the size and/or position of the display area. In one instance, as discussed more fully below, the indication to resize 255 is a double-click selection on a resize bar of the display area. In another instance, the indication to resize 255 is a keystroke sequence, such as an actuation of a combination of keys in conjunction (e.g., hotkeys). In yet another instance, the indication to resize 255 is a maintained selection of a toolbar, or header, of a display area, such as a prolonged click-and-hold command.

In addition, the input-receiving component 235 may be configured to track movements of a cursor. In embodiments, tracked movements 260 may be received from any input device (e.g., the input device 217, contact with a touch-screen panel of a tablet, and the like). The tracked movements 260 may be processed in cooperation, thus, acting as complimentary commands that invoke a triggered state. By way of example, the indication to resize 255 may include capturing the display area, while the tracked movements 260 may include a traversal of the cursor into an established dock-target region. Accordingly, a triggered state associated with the entered dock-target region is identified.

In an exemplary embodiment, upon receiving the indication to resize 255, the receiving component determines the type of input device that is providing inputs thereto. As discussed above, the dock-target regions are dynamically constructed based on the determined type of input device. The process of constructing may be executed in series, in parallel, or asynchronously with receiving the indication to resize 255. As such, it should be understood and appreciated that constructing one or more dock-target regions on a GUI workspace is accomplished according to rules within the receiving component 235 that may be influenced by the identity of the input device communicated therewith.

The GUI workspace component 240 is configured to identify the screen height and the screen width of the GUI workspace (e.g., the UI display 225) presented at the display device 215. These screen parameters 290 of the GUI workspace may be communicated to the GUI workspace component 240 from the display device 215, or internally from the operating system 220 that is rendering the UI display 225. In another embodiment, discussed more fully below with reference to FIG. 10, the GUI workspace component 240 is configured to determine the number of display devices that are operably coupled to the operating system 220 and the properties thereof. Accordingly, the GUI workspace component 240 may establish a navigation ordering scheme that links the display devices together in a logical arrangement such that a display area may be traversed therebetween on a single UI display 225.

In yet another embodiment, the GUI workspace component 240 is configured to interrogate the properties to the display area to determine the window height and width thereof. These parameters, along with the screen width, the screen height, and any other discernable attributes of the display area and/or GUI workspace relevant to generating configuration settings 295 may be retrieved by the GUI workspace component 240, processed, and handed to the state-determining component 245.

Generally, the state-determining component 245 facilitates automatically transitioning the display from the original state to a triggered state, or from the triggered state to the restored state. In one embodiment, the restored state is substantially similar in size to the original state. In operation, the state-determining component 245 acknowledges that the input-receiving component 235 has detected an indication to resize 255 identifying a trigger state from the set of window states (e.g., stored at the database 280 in a searchable manner, or generated by code embedded within the state-determining component 245). In one instance, identifying is carried out by following a map between a triggered dock-target area and an associated window state. Upon selecting an appropriate window state, or triggered state, the state-determining component 245 accepts parameters describing the display area and the GUI workspace from the GUI workspace component 240. These parameters are incorporated with, or appended to, the identity of the triggered state and provided to the rendering component 250.

In embodiments, the rendering component 250 is configured to provide configuration settings 295 to the display device 215 such that the display area may be manipulated (e.g., positioned and sized) according to the selected window state. These configuration setting may be derived or extracted from the selected window state by any method known in the relevant art. Further, the configuration settings 295 may be stored in a lookup table (e.g., utilizing the database 280) that is accessible to the rendering component 250, where the configuration settings 295 are mapped to one or more dock-target regions. Accordingly, the rendering component 250 may provide for presenting the display area as a particular window state, or for transitioning the display area between window states.

In an exemplary embodiment, configuration settings 295 are utilized to reformat the display area. Generally, the configuration settings 295 comprise rules that guide the GUI workspace to present the display area consistent with the selected window state defined by the configuration settings 295. The configuration settings 295 may encompass a wide scope of criteria or properties based on any window state. In one instance, the configuration settings 295 may be derived from the vertically-maximized state and include a vertical and horizontal dimension. By way of example only, the vertical dimension corresponds approximately to the screen height, as retrieved by the GUI workspace component 240, and the horizontal dimension corresponds to the window width of the display area, or an arbitrary width. In another instance, the configuration settings 295 are derived from a semi-maximized state and include a vertical dimension and a horizontal dimension. By way of example only, the vertical dimension corresponds to the screen height, and the horizontal dimension corresponds to a ratio of the screen width, as more fully discussed above.

Accordingly, the configuration settings 295 guide the dynamic transitions of the display area. That is, the configuration settings 295 dictate the dimensions of the display area and the coordinates of the location of the display area within the GUI workspace. Although one embodiment is discussed above, the configuration settings may include any set of heuristics (e.g., rules or logic) that affects characteristics and/or display attributes of the display area. In addition, the configuration settings 295 facilitate managing content published within the display area, or indicate to the application 230 the parameters to which content may be presented.

Generally, the application 230 is any program that may be launched and manipulated by the operating system 220. As discussed above, the application 230 manages content published within the display area. Thus, as the size of the display area is manipulated upon receiving the indication to resize 255, the content may be adjusted to reflect these changes. In one instance, the rendering component 250 includes an application programming interface (API) that exposes the configuration settings 295 to the application 230. Accordingly, the application 230 may be developed to customize software configurations based on the configurations settings 295. That is, the application can react to a transition and adjust the content it submits for presentation at the UI display 225 (e.g., GUI workspace) based on the size of the display area. In one embodiment, this process of adjusting content is executed internal to the application 230, thus, transparent to the operating system 220.

In addition, the application 230 may influence the configuration settings 295 generated by the rending component 250. For instance, if the application 230 is designed to expose content on a specific set of display-area sizes, this set of sizes is transferred to the rendering component 250 for consideration prior to releasing the configuration settings 295 to the GUI display. By way of example only, the set of display-area sizes may require that the size of the transitioned display area fall within a maximum and a minimum size limit. Accordingly, the configuration settings 295 are compared against the maximum size limit if the larger window state is triggered (e.g., a vertically-maximized state, or a semi-maximized state), while the configuration settings 295 are compared against the minimum size limit if a reduced window state is triggered (e.g., a restored state). If the set of display-area sizes are comparable to, or encompass the window state related to, the configuration settings 295, the configuration settings 295 remain unaltered. However, if the configuration settings 295 invoke a display area that extends beyond the set of display-area sizes, the configuration settings are reformed to coincide with the set of display-area sizes of the application 230.

Figure 3:
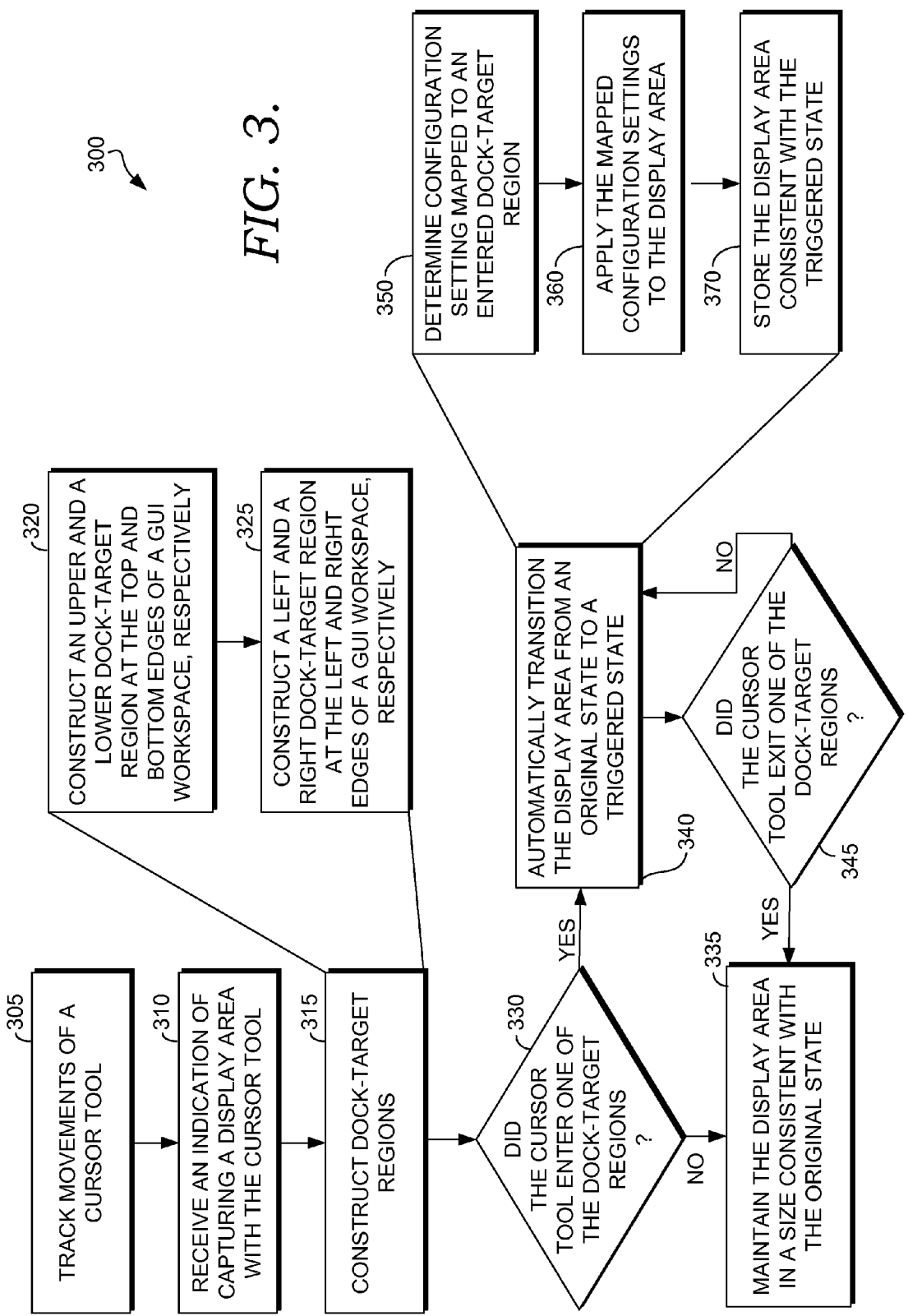
FIG. 3 is a flow diagram illustrating an overall method for transitioning a display area between a semi-maximized state and a restored state utilizing dock-target regions, in accordance with an embodiment of the present invention.

Turning now to FIG. 3, a flow diagram is shown that illustrates an overall method 300 for transitioning a display area between a semi-maximized state and a restored state utilizing dock-target regions, in accordance with an embodiment of the present invention. Initially, movements of the cursor tool are tracked within a GUI workspace (e.g., via the tracked movements 260 provided to the input-receiving component 235 of FIG. 2), as indicated at block 305. An indication of capturing a display area with the cursor tool (e.g., the indication to resize 255 of FIG. 2) is provided from an input device, as indicated at block 310. In embodiments, the type of input device is determined. This information, along with screen parameters, as discussed above, may be used to construct dock-target regions, as indicated at block 315. Generally, constructing the dock-target regions includes constructing an upper and a lower dock-target region at the top and bottom edges of the GUI workspace, respectively, as indicated at block 320. In operation, upon determining that a cursor tool has entered either the upper or lower dock-target regions, a state-selection process is executed (e.g., by the state-determining component 245 of FIG. 2) to select a maximized state as the triggered state, and apply the configuration settings thereof to the display area. In addition, constructing the dock-target regions includes constructing a left and a right dock-target region at the left and right edges of the GUI workspace, respectively, as indicated at block 325. In operation, upon determining that a cursor tool has entered either the left or right dock-target regions, a state-selection process is executed to select a semi-maximized state as the triggered state, and apply the configuration settings thereof to the display area.

The user-initiated movement of the cursor tool is tracked, and based upon the tracked movement a determination of whether the cursor tool entered one or more of the dock-target regions is performed, as indicated at block 330. If the cursor tool did not enter a docket-target region, the size of the display area is maintained consistent with its original state, as indicated at block 335. If the cursor tool did enter a docket-target region, the display area is automatically transitioned from an original state to a triggered state, as indicated at block 340. Upon automatically transitioning the display area, a determination of whether the cursor tool exited one of the dock-target regions, while the display area remains captured, is performed, as indicated at block 345. If the cursor tool did exit a docket-target region, the display area is automatically transitioned from the triggered state to a restored state, which is typically substantially similar to the size of the original state, as indicated at block 335. If the cursor tool did not exit a docket-target region, the size of the display area is maintained consistent with its triggered state, as indicated at block 340.

Automatically, transitioning the display, as indicated at block 340, may include several logical steps. Initially, configuration settings mapped to an entered docket-target area are determined, as indicated at block 350. These determined configuration settings may be applied to the display area, thus, transitioning the display area from an original state to a triggered state as defined by the configuration settings, as indicated at block 360. Accordingly, the display area may be stored in association with attributes of the triggered state, as indicated at block 370.

Figure 4:
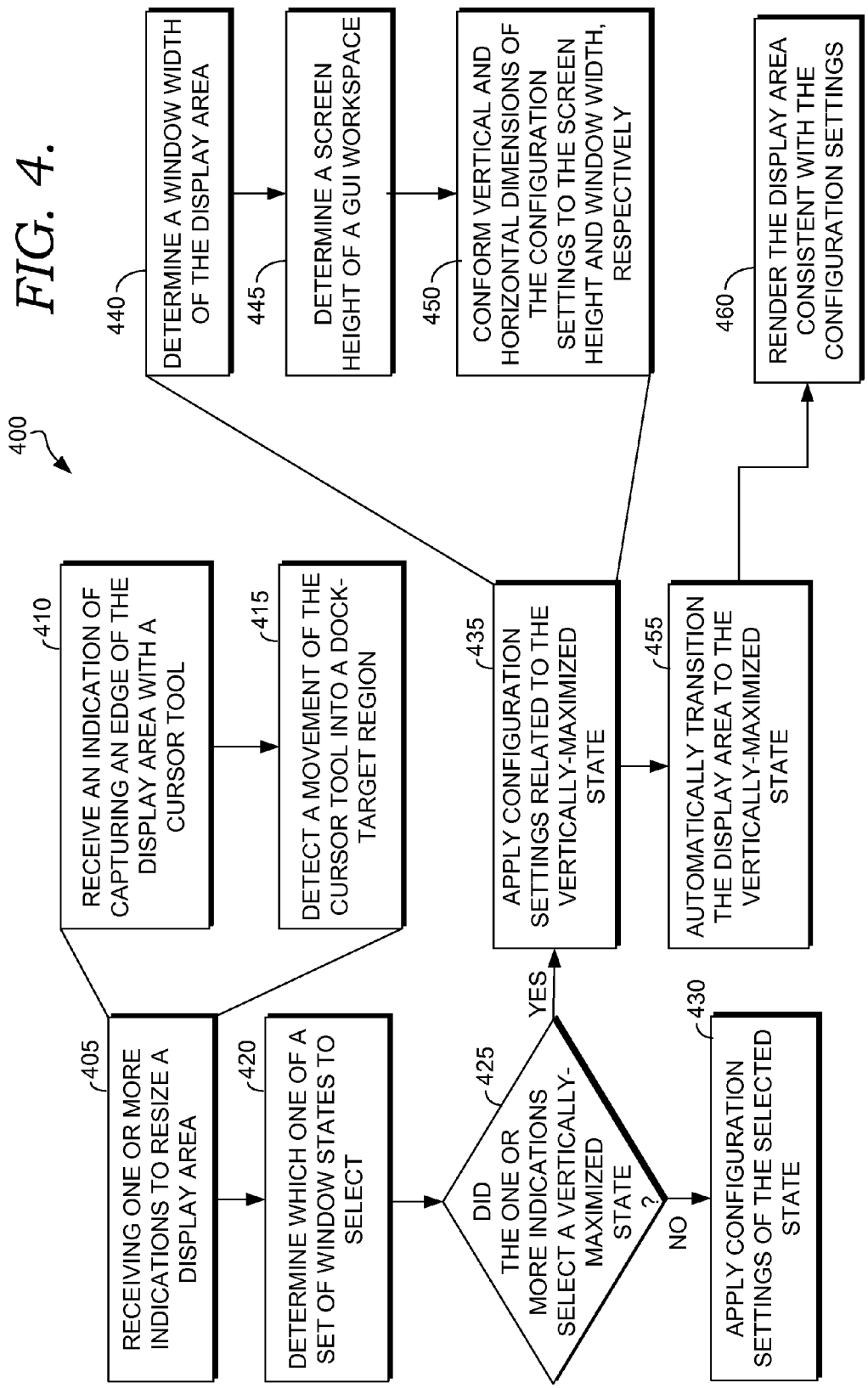
FIG. 4 is a flow diagram illustrating an overall method for arranging a display area on a graphical user interface (GUI) workspace, in accordance with an embodiment of the present invention.

With reference to FIG. 4, a flow diagram is shown illustrating an overall method for arranging a display area on a graphical user interface (GUI) workspace, in accordance with an embodiment of the present invention. Initially, as indicated at block 405, one or more indications to resize a display area are received. In particular, receiving an indication to resize may include receiving an indication that a cursor tool captured an edge of the display area, such as a click-and-hold operation (see block 410), and detecting a movement of the cursor tool into a dock-target region (see block 415). In other embodiments, receiving one or more indications to resize includes detecting a selection by a cursor, such as a double-click, at a hidden actuation device proximate to an edge of the display area (e.g., a resize bar), recognizing a specific keystroke sequence, or receiving indications of any other behavior known to invoke a change in a window state.

Incident to receiving one or more indications to resize, a determination of which window state within a set of pre-defined window states to select is made, as indicate at block 420. In particular, a query of whether the indications select a vertically-maximized state is executed, as indicated at block 425. If the vertically-maximized state is not selected, configuration settings of the actual selected state are applied to the display area, as indicated at block 430. Alternatively, if the vertically-maximized state is selected, configuration settings of the vertically-maximized state are applied to the display area, as indicated at block 435. Generally, applying the configuration settings includes, at least, the following logical steps: determining a window width of the display area (see block 440), determining a screen height of the GUI workspace (see block 445), and conforming a vertical and a horizontal dimension of the configurations settings to the screen height and the window width, respectively (see block). Accordingly, the display area is transitioned to the vertically-maximized state from an original state, as indicated at block 455. As indicated at block 460, the display area may be rendered, at a GUI workspace on a display device, in the vertically-maximized state consistent with the configuration settings that define the vertically-maximized state.

Figure 5:
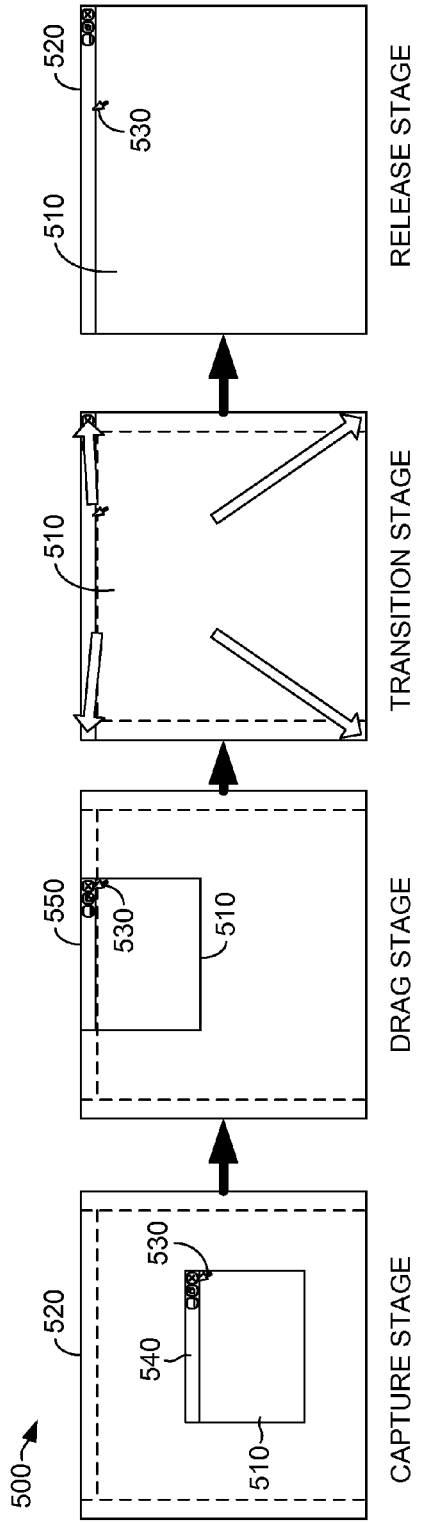
FIGS. 5-10 are progressive screen displays illustrating stages for transitioning exemplary display areas between an original state, a triggered state, and a restored state, in accordance with embodiments of the present invention.

Referring now to FIGS. 5-10, progressive screen displays illustrating stages for transitioning exemplary display areas between an original state, a triggered state, and a restored state are shown, in accordance with embodiments of the present invention. In particular, a procedure 500 for transitioning a display area 510 from an original state to a maximized state is depicted at FIG. 5, in accordance with embodiments of the present invention. Initially, the display area 510 is captured, typically by selecting a header 540 with a cursor tool, at the capture stage. The display area is then translated across a GUI workspace 520 such that the cursor tool, while the display area 510 is captured, enters a top, or bottom, dock-target region 550. This is indicated at the drag stage. In the transition stage, the display area 510 is transitioned from the original state to a maximized state. That is, the display area 510 is extended to fill substantially the entire area of the GUI workspace 520. Upon releasing the cursor tool 530, the display area 510 is held in the maximized state, as indicated at the release stage.

Figure 6:
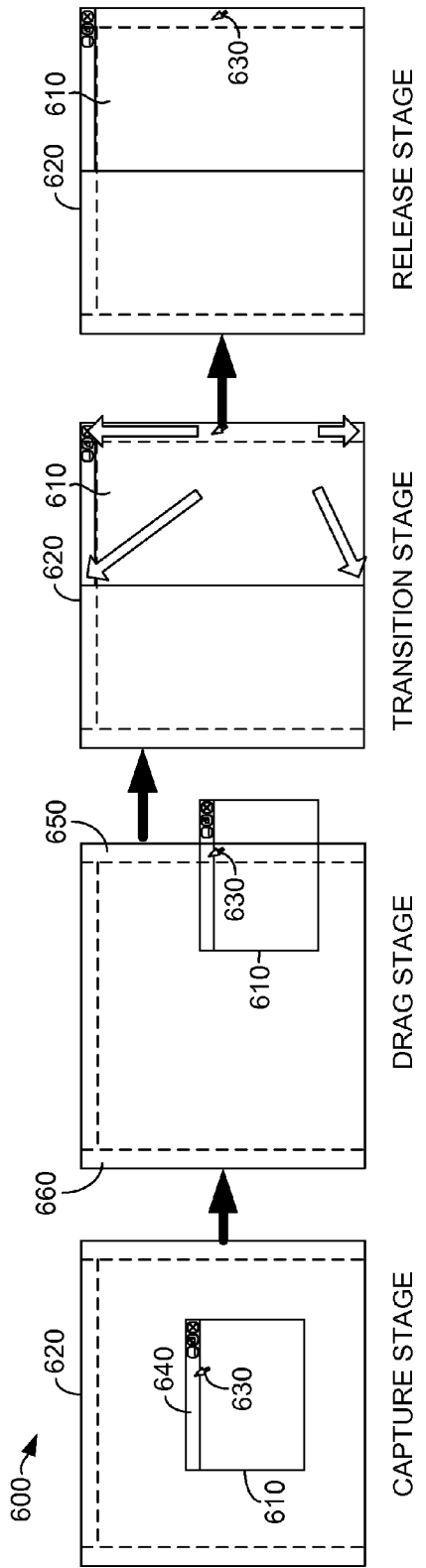

Turning now to FIG. 6, a procedure 600 for transitioning a display area 610 from an original state to a semi-maximized state is depicted, in accordance with embodiments of the present invention. Initially, the display area 610 resides in its original state. A header 640, or any other section on the display area 610 configured for a click-and-drag operation, is selected by a cursor tool 630. Accordingly, the display area 610 is captured at the capture stage. In the drag stage, the display area 610 is translated to a left, or right, side of the GUI workspace 620. Upon the cursor tool 630 entering a left, or right, dock-target region, the display area is transitioned from the original state to a semi-maximized state. This is indicated at the transition phase. In the release state, the display area 610 is released from capture. Accordingly, in the semi-maximized stage, the display area now covers a right, or left, side of the GUI workspace.

Figure 7:
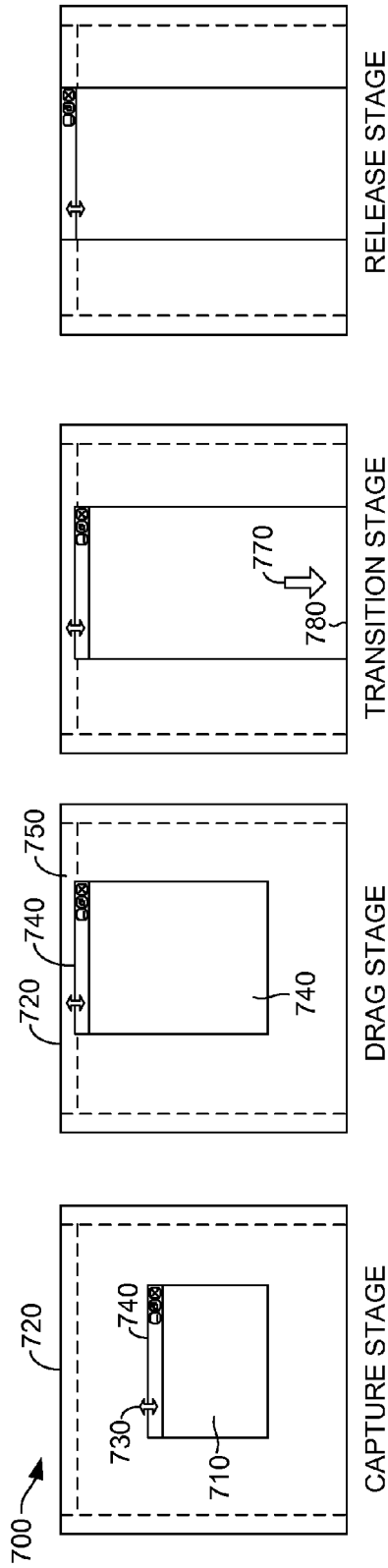

Turning now to FIG. 7, a procedure 700 for transitioning a display area 710 from an original state to a vertically-maximized state is depicted, in accordance with embodiments of the present invention. Initially, the display area 710 resides in its original state. A top edge 740, or bottom edge of the display area 710, is selected by a cursor tool 730 in the capture stage. In one instance, an icon indicating the cursor tool is visibly altered to indicate that the top edge 740 is captured. In the drag stage, the display area 710 is stretched, either upward or downward to a dock-target region. In this instance, the top edge 740 is vertically traversed to an upper dock-target region 750. Upon the cursor tool 730 entering the upper dock-target region 750, the opposed edge 780 to the selected top edge 740 is extended in a snap-style adjustment, as shown by arrow 770 in the transition phase. Accordingly, in the vertically-maximized state, the display area 710 assumes a window height of substantially a screen height of the GUI workspace 720, while the window width remains constant.

Figure 8:
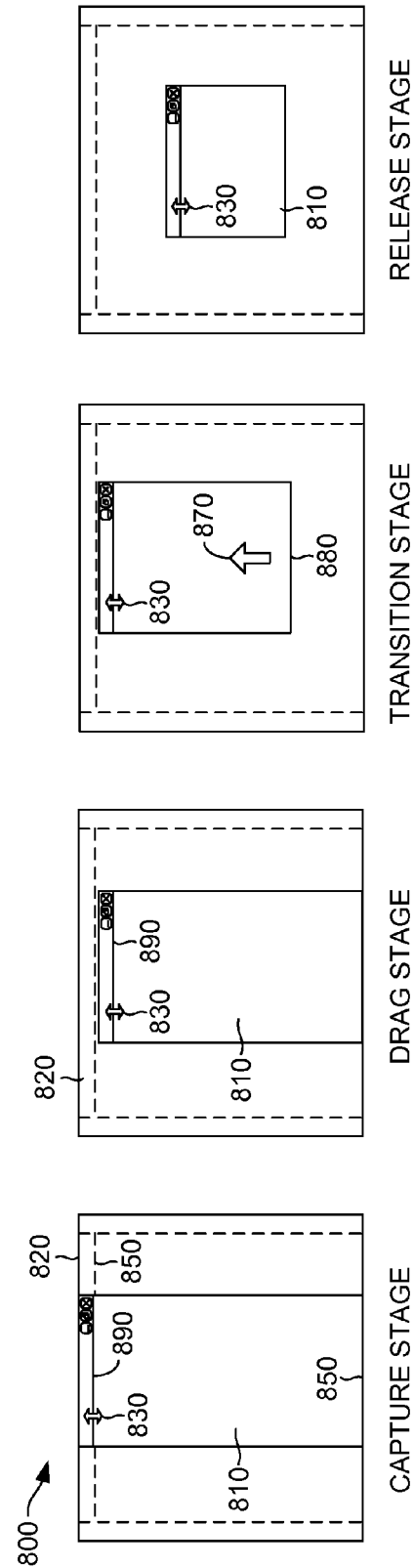

A procedure 800, as shown in FIG. 8, is provided for transitioning a display area 810 from the vertically-maximized state to a restored state, in accordance with embodiments of the present invention. Initially, the display area 810 resides in the vertically-maximized state in the capture stage. A top edge 890, or bottom edge of the display area 810, may be selected by a cursor tool 830. In the drag stage, the display area 810 is vertically compressed, either upward or downward out of a dock-target region. In this instance, the top edge 890 is vertically traversed out of an upper dock-target region 850. Upon the cursor tool 830 exiting the upper dock-target region 850, an opposed edge 880 to the selected top edge 890 is drawn upward in a snap-style adjustment, as shown by arrow 870 in the transition phase. Accordingly, in the restored state, the display area 810 assumes a window height of width of display area 710 of FIG. 7 in the original state.

In an exemplary embodiment, a cancelability feature is incorporated in the window-state transitional behavior of the present invention. Generally, cancelability refers to the technique of dragging a cursor tool into a dock-target region, while the display area is captured, and without releasing, dragging the cursor tool therefrom. Accordingly, when the cursor tool enters the dock-target region, the display window temporarily is presented as the appropriate triggered state (e.g., in a phantom window, or any other preview model or actual display). If the cursor tool does not release the display area, when the cursor tool exits the dock-target region, the display area reverts back to the restored state. Turning to the transition stage of FIG. 7 and the transition stage of FIG. 8, one application of the cancelability feature is depicted. In particular, the window 710 is transitioned from the original state to a vertically-extended state upon the cursor tool 730 entering the upper dock-target region 750. If, without releasing the top edge 740, the cursor tool exits the upper dock-target region 750, the display area 710, now display area 810, resumes the original window state without addition selections or commands.

Figure 9:
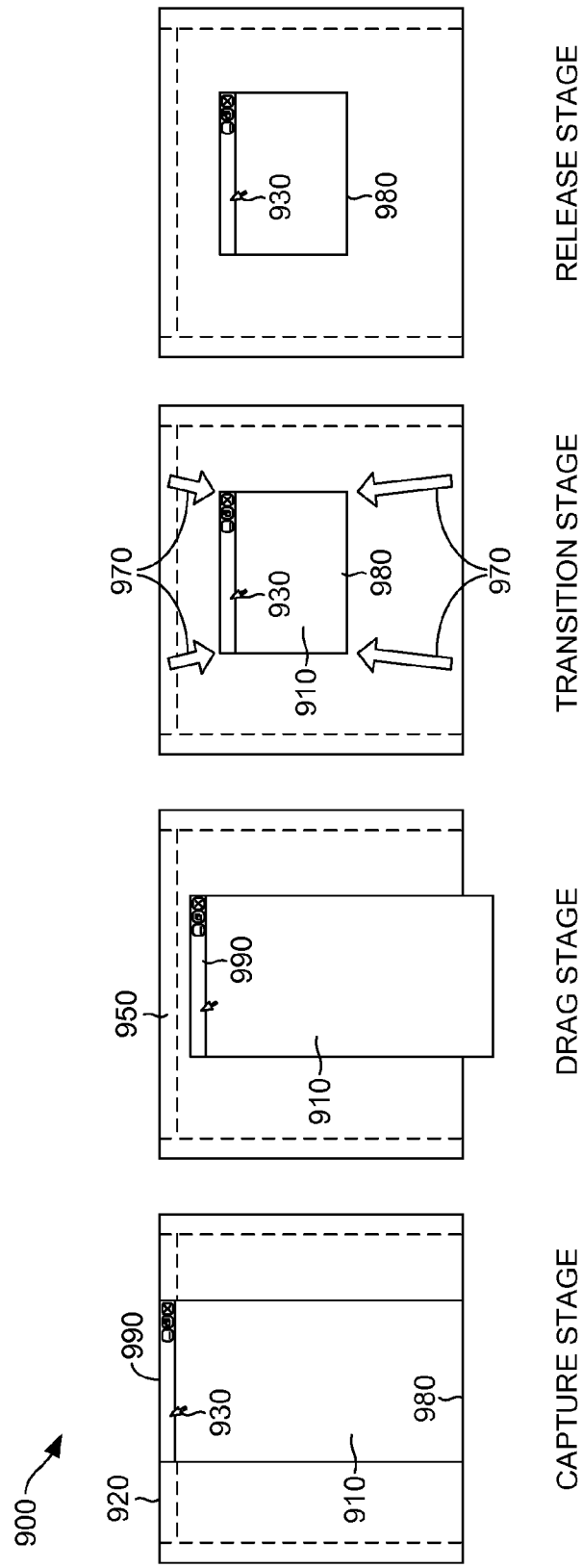

A procedure 900, as shown in FIG. 9, is provided for transitioning a display area 910 from the vertically-maximized state to a restored state, in accordance with embodiments of the present invention. Initially, the display area 910 resides in the vertically-maximized state in the capture stage. A header 990 may be selected by a cursor tool 930. In the drag stage, the display area 910 is traversed, either upward or downward, such that the cursor tool 930 leaves a dock-target region. In this instance, the header 990 is vertically traversed downward out of an upper dock-target region 950. Upon the cursor tool 930 exiting the upper dock-target region 950, an opposed edge 980 to the selected header 990 is drawn upward in a snap-style adjustment, as shown by arrow 970 in the transition phase. Accordingly, in the restored state, the display area 910 assumes a window height of width of display area 710 of FIG. 7 in the original state.

Figure 10:
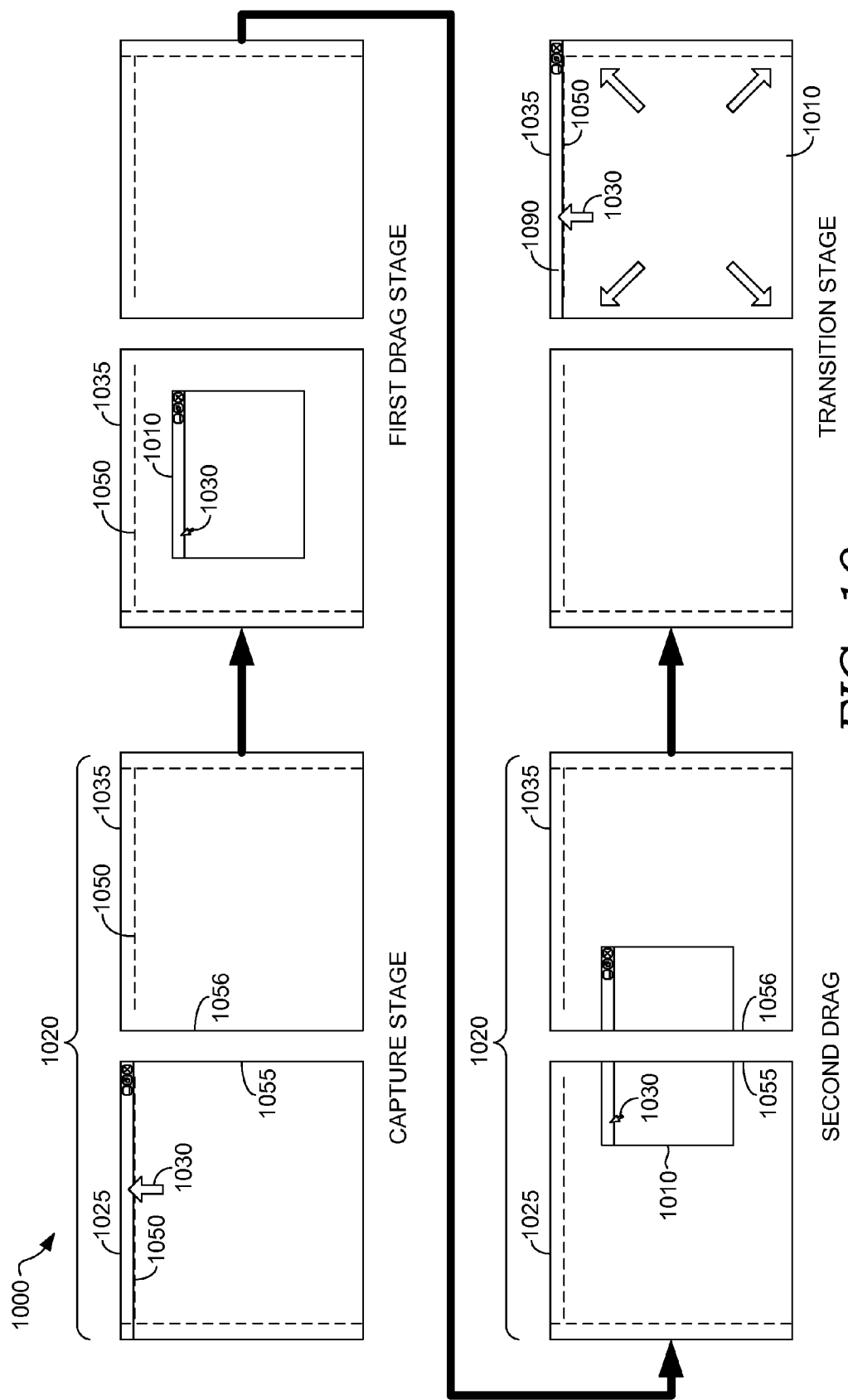

Turning now to FIG. 10, a procedure 1000 for transitioning a display area 1010 from maximized state on a display device 1025 to a maximized state on a display device 1035 is depicted, in accordance with embodiments of the present invention. Initially, screens of the display devices 1025 and 1035 act is cooperation to present a GUI workspace 1020. In an exemplary embodiment, as more fully discussed above, a navigation ordering scheme that links the display devices 1025 and 1035 together in a logical arrangement such that the display area 1030 may be traversed therebetween on the GUI workspace 1020. In addition, the navigation ordering scheme indicates common edges 1055 and 1056 that would divide the GUI workspace 1020. Typically, dock-target regions are not established on the common edges 1055 and 1056 such that the display area 1010 may traverse between display devices 1025 and 1035 without unintentional window-state changes.

The display area 1010 resides in its maximized state in the capture stage. A header 1090 may be selected by a cursor tool 1030, thereby capturing the display area 1010. In the first drag stage, the display area 1010 is translated, either upward or downward, from a dock-target region. In this instance, the header 1090 is vertically traversed from an upper dock-target region 1050, which extends across the display devices 1025 and 1035. Upon the cursor tool 1030 exiting the upper dock-target region 1050, the display area 1010 assumes a restored state. Accordingly, as indicated in the second drag stage, the display area 1010 may be traversed across the display devices 1025 and 1035, yet within the same GUI workspace 1020 with the common edges 1055 and 1056 affecting the window state of the display area 1010. In the transition stage, the cursor tool may enter the upper dock-target region 1050 of the display device 1035, while the header 1090 remains captured. Consequently, the display area is transitioned to a maximized state that substantially fills a screen area of the display device 1035.

Figure 11:
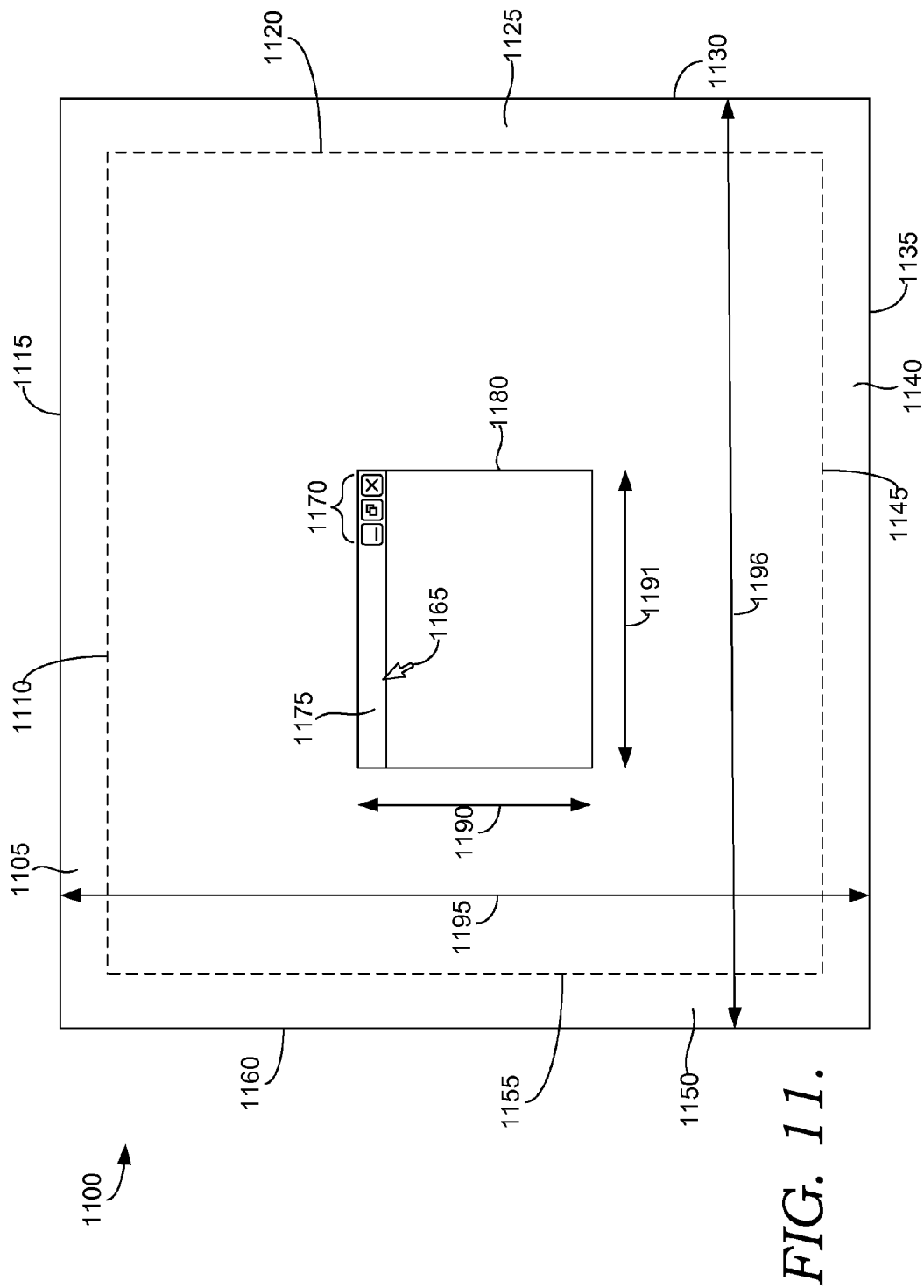
FIG. 11 is an diagrammatic view of an exemplary GUI display provided with dock-target regions that affect the window state of a display area, in accordance with an embodiment of the present invention.

Turning now to FIG. 11, a diagrammatic view illustrating an exemplary GUI display 1100 provided with dock-target regions 1105, 1125, 1140, and 1150 that facilitate triggering a transition of window states of a display area 1180 is shown, in accordance with an embodiment of the present invention. Initially, an upper dock-target region 1105 is depicted as being defined by a top edge 1115 and a first trigger line 1110 in substantial parallel-spaced relation to the top edge 1115. A lower dock-target region 1140 is depicted as being defined by a bottom edge 1135 and a second trigger line 1145 in substantial parallel-spaced relation to the bottom edge 1135. In an exemplary embodiment, the screen area within the upper dock-target region 1105 and the lower dock-target region 1140 is mapped to configuration settings of a maximized state.

A right dock-target region 1125 is depicted as being defined by a right edge 1130 and third trigger line 1120 in substantial parallel-spaced relation to the right edge 1130. A left dock-target region 1160 is depicted as being defined by a left edge 1160 and fourth trigger line 1155 in substantial parallel-spaced relation to the left edge 1160. In an exemplary embodiment, the screen area within the right dock-target region 1125 and the left dock-target region 1150 is mapped to configuration settings of a semi-maximized state The display area 1180 presented on the GUI workspace in an original state. In the original state, attributes of the display area 1180 include a window width 1191 and a window height 1190. In addition, the display area includes a header 1175, or a toolbar area. The header 1175 may include buttons 1170 and a hidden actuation device (not shown) for invoking a transition to a vertically-maximized state or a semi-maximized state. The hidden actuation device may also be located on other edges of the display area 1180. As such, a new visible button in the buttons 1170 is not necessary for receiving actuation events from a user.

The GUI workspace includes screen parameters that are typically measured by the GUI workspace component 240 of FIG. 2. In one instance, the screen parameters include a screen height 1195, which is measured between the horizontal edges 1115 and 1135, and a screen width 1196, which is measured between the vertical edges 1130 and 1160.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media excluding signals per se having computer-executable instructions embodied thereon that, when executed, perform a method for arranging a display area on a background screen of a UI display having a screen height and a screen width, the method comprising:
    receiving one or more indications to resize the display area being presented on the UI display, wherein the display area is characterized by a window height and a window width, wherein hidden actuation devices for receiving the one or more indications to resize the display area are established proximate to one or more edges of the background screen, wherein the actuation devices are mapped to a set of window states, respectively, wherein receiving comprises:
    (a) detecting a selection by the user at one of the hidden actuation devices on the background screen; and
    (b) determining which of the set of window states is mapped to the selected hidden actuation device; and upon determining that the selected hidden actuation device is mapped to a vertically-maximized state of the set of window states, automatically transitioning the display area to the vertically-maximized state, wherein automatically transitioning comprises:
        (a) resizing the window height of the display area on the GUI workspace to a vertical dimension defined by configuration settings of the vertically-maximized state, wherein the vertical dimension is defined as corresponding to the screen height; and
        (b) in concurrence with resizing the window height of the display area, resizing the window width of the display area on the GUI workspace to a horizontal dimension defined by the configuration settings of the vertically-maximized state, wherein the horizontal dimension is defined as corresponding to a predefined ratio of the screen width that is less than the screen width.

2. The media of claim 1, wherein receiving one or more indications to resize the display area being presented on the GUI workspace further comprises:

receiving an indication of capturing an edge of the display area; and detecting a vertical movement of the input into a dock-target region.

3. The media of claim 1, wherein automatically transitioning the display area to the vertically-maximized state comprises resizing the window width of the display area to the horizontal dimension that is one half the screen width.

4. A computerized method for transitioning a display area between a semi-maximized state and a restored state utilizing one or more dock-target regions on a background screen of a UI display, the method comprising:

tracking movements of an input within the UI display, the UI display having a screen height, measured between horizontal edges of the GUI workspace, and a screen width measured between vertical edges of the UI display;

providing at least one display area that is at least partially displayed within the UI display;

receiving an indication of capturing the at least one display area with the input upon a user selecting a section of the display area, the at least one display area residing in an original state;

providing the one or more dock-target regions within the UI display that are located proximate to at least one of the horizontal edges or the vertical edges of the background screen of the UI display, wherein each of the one or more dock-target regions are associated with one of a set of window states and hidden from view on the UI display;

utilizing the tracked movements to determine whether the input or a portion of the display area entered within the one or more hidden dock-target regions while dragging the at least one captured display area; and incident to determining that the input or the portion of the display area entered within the one or more hidden dock-target regions, automatically transitioning the at least one display area from the original state to a triggered state, wherein the triggered state corresponds to one of the set of window states that is associated with the one or more entered dock-target regions, and wherein the at least one display area is resized upon transitioning between the original state and the triggered state.

5. The method of claim 4, wherein automatically transitioning the at least one display area from the original state to a triggered state comprises:

determining configuration settings mapped to the one or more entered dock-target regions, wherein each of the set of window states having corresponding configuration settings;

applying the mapped configuration settings to the at least one display area; and at least temporarily storing the at least one display area consistent with the triggered state.

6. The method of claim 5, wherein the set of window states includes a semi-maximized state, the semi-maximized state having configuration settings comprising:

a vertical dimension corresponding to the screen height of the GUI workspace screen parameters; and a horizontal dimension corresponding to a ratio of the screen width of the GUI workspace screen parameters.

7. The method of claim 6, wherein providing one or more dock-target regions adjacent to at least one of the horizontal edges or the vertical edges of the GUI workspace comprises:

constructing an upper dock-target region on a top edge of the horizontal edges of the GUI workspace; and constructing a lower dock-target region on a bottom edge of the horizontal edges of the GUI workspace, wherein, incident to determining the input or the portion of the display area entered within the upper dock-target region or the lower dock-target region, automatically transitioning the at least one display area from the original state to a maximized state, the maximized state having configuration settings comprising:

(1) a vertical dimension corresponding to the screen height of the GUI workspace screen parameters; and (2) a horizontal dimension corresponding to the screen width of the GUI workspace screen parameters.

8. The method of claim 4, further comprising translating the at least one captured display area according to tracked movements, wherein the at least one captured display area includes an edge defined by a window height and a window width, and wherein the edge is visible on the GUI workspace during the translation of the at least one captured display area.

9. The method of claim 8, further comprising, incident to automatically transitioning the at least one display area from the original state to a triggered window state, temporarily adjusting the window height to the vertical dimension and the window width to the horizontal dimension of the semi-maximized state.

10. The method of claim 4, further comprising:

determining whether the input or the display area exited the one or more dock-target regions utilizing the tracked movement; and incident to determining the input or the display area exited the one or more dock-target regions, automatically restoring the at least one display area from the triggered state to the original state.

11. The method of claim 4, wherein constructing one or more dock-target regions adjacent to at least one of the horizontal edges or the vertical edges of the GUI workspace comprises:

constructing a right dock-target region on a right edge of the vertical edges of the GUI workspace; and constructing a left dock-target region on a left edge of the vertical edges of the GUI workspace, wherein, incident to determining the input or the portion of the display area entered within the right dock-target region or the left dock-target region, automatically transitioning the at least one display area from the original state to a semi-maximized state.

12. The method of claim 4, further comprising presenting the GUI workspace on a plurality of display devices that are managed according to spatial-navigation heuristics, wherein management comprises:

construction one or more dock-target regions adjacent to at least one of the horizontal edges and the vertical edges of the plurality of display devices;

identifying common edges of the plurality of display devices that divide the GUI workspace; and disabling the one or more dock-target regions adjacent to the identified common edges facilitating translation of the at least one display area between the plurality of display devices.

13. The method of claim 4, further comprising identifying a type of input device providing the indication of capturing the at least one display area, wherein a screen area within the one or more dock-target regions is established according to the identified type of input device.

14. The method of claim 5, further comprising:

incident to determining the input or the portion of the display area entered within the one or more dock-target regions, interacting with an application presenting on the at least one display area to determine a set of allowed window sizes;

comparing the set of allowed window sizes against the configuration settings corresponding to the triggered state; and if the configuration settings conflict with the set of allowed window sizes, automatically transitioning the at least one display area to one of the set of allowed window sizes.

15. One or more computer-storage media excluding signals per se having computer-executable instructions embodied thereon for presenting on one or more display devices a user interface comprising:

UI display having horizontal edges and vertical edges, wherein screen parameters are derived from a background screen of the UI display which include a screen height, measured between the horizontal edges, and a screen width measured between the vertical edges, the vertical edges comprising a left edge and a right edge, the horizontal edges comprising a top edge and a bottom edge;

an upper dock-target region that is proximate to the top edge and a first trigger line in substantial parallel-spaced relation to the top edge;

a lower dock-target region that is proximate to the bottom edge and a second trigger line in substantial parallel-spaced relation to the bottom edge;

a right dock-target region that is proximate to the right edge and third trigger line in substantial parallel-spaced relation to the right edge;

a left dock-target region that is proximate to the left edge and fourth trigger line in substantial parallel-spaced relation to the left edge, wherein the upper, lower, right, and left dock-target regions are hidden from view on the GUI workspace, while the first, second, third, and fourth trigger lines represent invisible user-interface features; and a display area presented on the UI display in an original state, wherein a first screen area within the upper dock-target region and the lower dock-target region is mapped to configuration settings of a maximized state, and wherein the display area is transitioned from the original state to the maximized state by dragging the display area into the first screen area, wherein the display area is resized upon transitioning between the original state and the maximized state, and wherein a second screen area within the right dock-target region and the left dock-target region is mapped to configuration settings of a semi-maximized state, and wherein the display area is transitioned from the original state to the semi-maximized state by dragging the display area into the second screen area, wherein the display area is resized upon transitioning between the original state and the semi-maximized state.

16. The media of claim 15, wherein, incident to dragging the display area, if a user input traverses the first trigger line or the second trigger line, the display area is automatically adjusted between the maximized state and a restored state, the maximized state having configuration settings including a vertical dimension corresponding the screen height, and a horizontal dimension corresponding to the screen width, the restored state being sized according to the original state.

17. The media of claim 15, wherein, incident to dragging the display area, if a user input traverses the third trigger line or the fourth trigger line, the display area is automatically adjusted between the semi-maximized state and a restored state, the semi-maximized state having configuration settings including a vertical dimension corresponding the screen height, and a horizontal dimension corresponding to a ratio of the screen width, the restored state being sized according to the original state.

18. The media of claim 3, wherein automatically transitioning the display area to the vertically-maximized state comprises automatically moving the display area upon concurrently resizing the display height to the screen height and the display width to one half the screen width, wherein moving comprises presenting the transitioned display area such that the transitioned display area occupies a right half or a left half of the screen.

* * * * *